Nov. 24, 1925.
C. C. KRUSE
1,562,893
RECORDING MECHANISM
Filed June 30, 1923
2 Sheets-Sheet 2
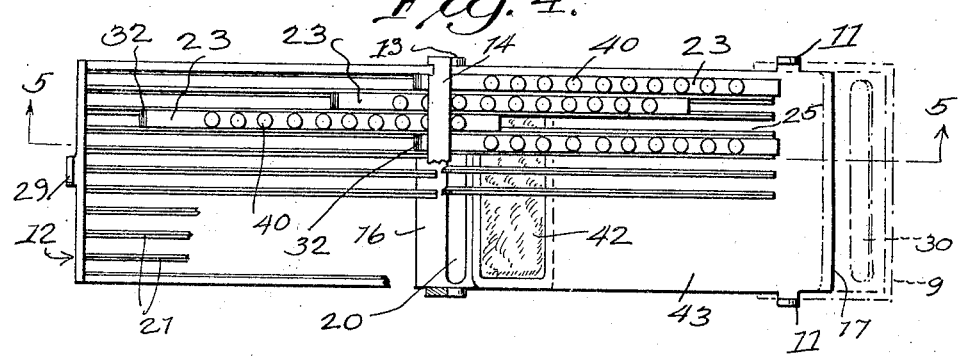
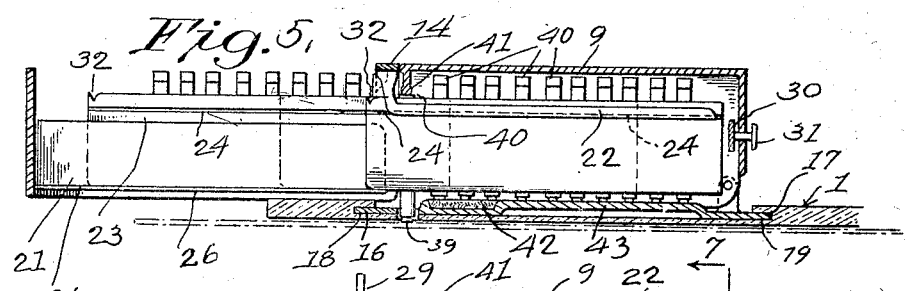
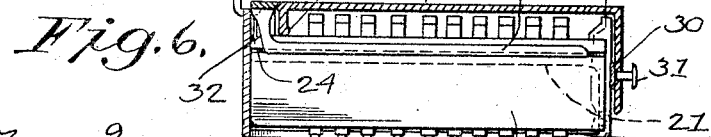
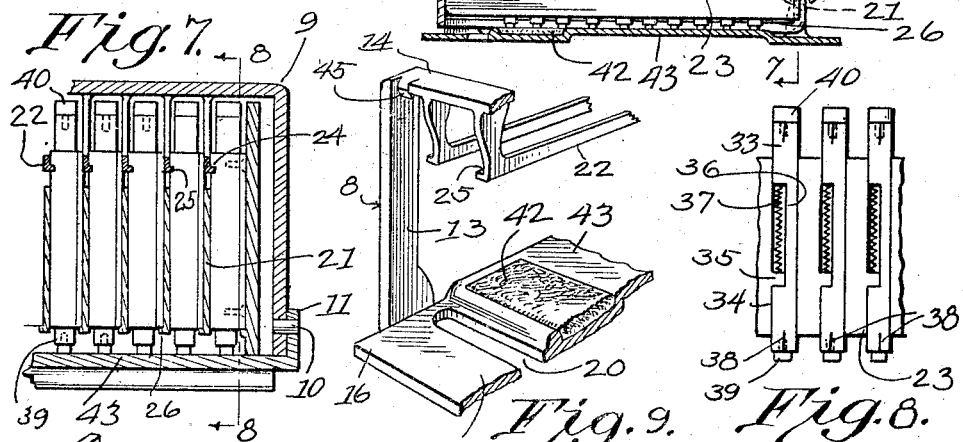
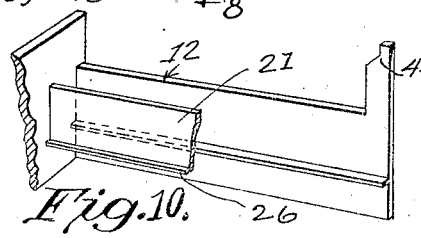
Inventor
C. C. Kruse
By C. G. Siggers
Attorney Patented Nov. 24, 1925.

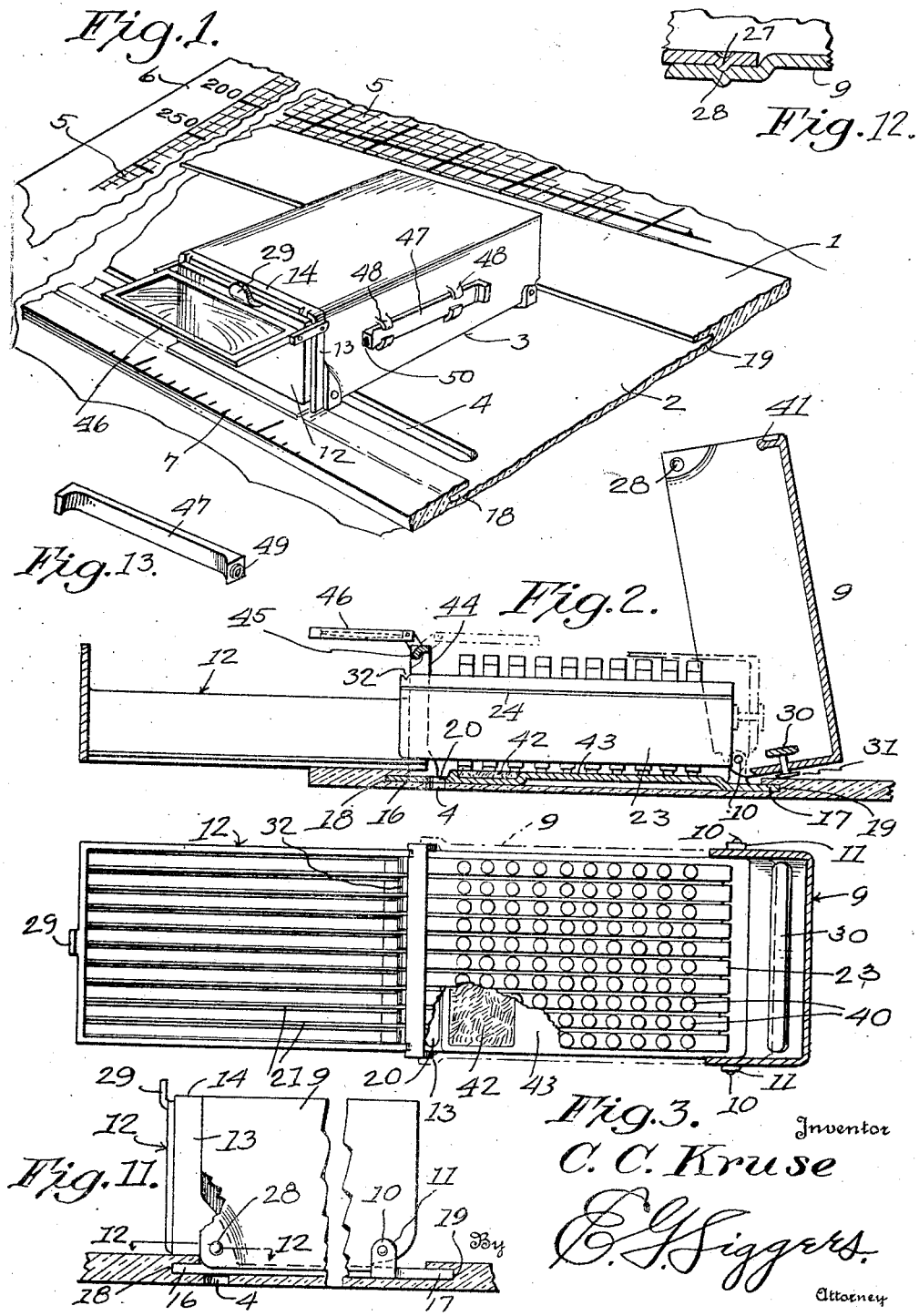

1,562,893

UNITED STATES PATENT OFFICE

CHARLES C. KRUSE, OF MODESTO, CALIFORNIA.

RECORDING MECHANISM.

Application filed June 30, 1923. Serial No. 648,855.

*To all whom it may concern:*

Be it known that I, CHARLES C. KRUSE, a citizen of the United States, residing at Modesto, in the county of Stanislaus and State of California, have invented a new and useful Recording Mechanism, of which the following is a specification.

This invention relates to recording mechanism, which is adapted to print on suitable record sheets certain predetermined combinations, or permutations of numerals, letters or other characters, which when interpreted by a prearranged code, convey certain information in regard to the articles recorded, which are identified by serial numbers.

The sheet on which the combinations are to be printed is preferably ruled horizontally and vertically after the manner of graph paper, and the coordinates of each space, or row of spaces, are defined by the predetermined serial number of the article to which the recorded information relates. Records made and arranged in this manner take up comparatively little space, and therefore make it possible to secure in a practical and compact form all the necessary data with reference to a very large number of articles.

This method of recording is especially useful in connection with automobiles as identified by their license numbers. The several characters in the combination, which may all be printed in a very small space, may denote any information which is suitable for the purpose of identifying the automobile, such, for example, as the make, the type, the year of manufacture, the amount of mortgage thereon, and one of the spaces may be used to indicate if the article recorded has been reported as stolen. A policeman, or other official provided with a set of these sheets may, whenever he sees an automobile at once look up the license number and determine whether the same has been reported as stolen, and also may, by the other information contained on the sheet, determine whether the automobile corresponds to the description of the one which has been licensed under that number.

The general object of the present invention is to provide practical and convenient mechanism by which any desired combination of characters may be quickly and accurately selected and printed according to the system above described. This mechanism has also been devised with a view to printing the information in the smallest possible space, in order that the record of the enormous number of automobiles now used may be kept in the most concise form possible.

The detailed construction of the mechanism by which these objects may be attained and the mode of operation thereof will be more specifically described in connection with the accompanying drawings, which illustrate the invention in its preferred form.

In the drawings:

Figure 1 is a fragmentary perspective view of the invention resting on the record sheet.

Figure 2 is a longitudinal section through the invention with the drawer and cover open.

Figure 3 is a plan view of the same, with parts broken away or shown in section.

Figure 4 is a similar view with the type bars arranged to print a certain combination.

Figure 5 is a vertical section taken on the line 5—5 of Figure 4.

Figure 6 is a longitudinal section through the box, with the cover and drawer closed.

Figure 7 is a fragmentary sectional view on the line 7—7 of Figure 6.

Figure 8 is a fragmentary view in elevation of a portion of the type bar as viewed from the line 8—8 of Figure 7.

Figure 9 is a fragmentary perspective view of a portion of the inside frame of the box.

Figure 10 is a fragmentary perspective view of a portion of the drawer.

Figure 11 is a fragmentary side elevation of the box with the base plate shown in section.

Figure 12 is a detail sectional view on the line 12—12 of Figure 11.

Figure 13 is a perspective view of a type which may be separately used.

All of the views are somewhat magnified, in order that the same may be made readily readable.

The invention comprises a base plate 1 having a depressed portion or channel 2 extending from side to side, which slidably receives a box 3 containing the printing elements and the mechanism hereinafter described for selecting and positioning the same, so that they may be projected through the slot 4 to print the selected combination in the proper space on the record sheet 5. The latter is preferably provided along one edge with appropriate data 6, so that the mechanism may be vertically positioned at the proper space on the sheet, while one edge of the base plate 1 may be provided with a scale 7 for determining the lateral adjustment of the box 3.

The box 3, which contains the printing mechanism, includes an inside frame 8, a cover 9 hinged at 10 to ears 11 upstanding from the rear corners of the frame 8, and a drawer 12 mounted to slide between the side bars 13 of the frame 8. The side bars 13 are connected at their upper ends by a cross bar 14, against which the front upper edge of the cover 9 abuts when it is closed. The frame 8 also includes a floor 15 having protruding edges 16 and 17, which are adapted to be guided in corresponding slots 18 and 19 formed at the sides of the channel 2. This floor is provided with a slot 20 adapted to register with the slot 4 in the base plate.

The drawer 12 is open at the bottom, but is provided with a series of longitudinal spacer bars 21 arranged in the same vertical planes with corresponding spacer bars 22, which are supported by the cross bar 14 of the inside frame 8. Each of the longitudinal spaces so formed is adapted to receive a type bar 23, which is provided in its side with a longitudinal channel 24, by means of which it is guided on a rib 25 formed on an adjacent bar 22. Each spacer bar 21 is also provided with a rib 26 along which the lower edge of the type bar is guided.

The box 3 is normally kept closed when not in use, as shown in Figures 1 and 6. The sides of the frame 8 are each preferably formed with a bead 27 adapted to register with a corresponding recess 28 in the front edge of the adjacent side of the cover, to retain the latter when closed. A bar 30, supported from the rear side of the cover by a stem 31, extends transversely across the rear ends of the type bars 23, and when the drawer 12 is opened by means of the finger piece 29, and before the cover is raised, the stem 31 may be depressed to force the bar 30 against the backs of the type bars and project the same slightly beyond the edge of the frame 8, so that the notches 32 at the forward ends of the type bars may be readily engaged by the finger nail to withdraw the type bars to the selected positions.

Each type bar 23 is provided with a series of types 33 mounted to reciprocate in vertical slots 34 formed in the bar. At the side of each slot is formed a lug 35, which projects into a recess 36 formed in the side of the type 33, and a coiled spring 37 resting on the lug 35 holds the type normally in its uppermost position. Each type is formed with a split lower end 38 in which any desired character 39 may be removably held. The upper end of the type is provided with a similar split end adapted to receive a head 40, which bears a similar character, thus making it easy to identify the various types.

When the type bars have been adjusted so that the desired combination is above the slot 20, the cover may be lowered so that the flange 41, formed at the front side thereof, will simultaneously engage the heads of all the types in the combination selected and imprint the same on the sheet beneath. In the floor 15, immediately behind the slot 20, an inking pad 42 is placed so that the surface thereof is flush with the raised portion 43 of the floor, on which the lower ends of the types normally rest. Thus, it will be seen that each type as it advances comes into wiping contact with the pad 42 immediately prior to the printing.

The sides of the drawer 12 are provided at their rear ends with upstanding projections 44, which engage a downturned lug 45 to limit the outward movement of the drawer. When the drawer is in its outermost position, the type bars 23 may be withdrawn until the ribs 25 ride out of the slots 24, whereupon the type bars may be readily lifted out of the drawer.

Since it is desirable to print the record on as fine a scale as possible, it is provided with a magnifying glass 46, which may be pivotally supported on the frame bars 13.

It is to be understood that as many characters as desired may be mounted on each type bar, and also any number of type bars may be used. A relatively small number are necessary, owing to the great number of combinations which may be obtained by different relative arrangements of the bars. If there are ten characters on each bar, for instance, two bars will be sufficient to give a hundred different combinations, and this will ordinarily be sufficient to designate the make of the automobile.

One of the important advantages of keeping such a record is to simplify the detection of stolen automobiles. When used for this purpose, one of the types on one of the bars may be provided with a character which indicates that the automobile so designated has been stolen. Ordinarily, however, the records are prepared periodically, and it will be necessary to add the character which means "stolen," whenever the report of the theft is made. For convenience in making this additional entry, it is desirable to have an extra type, such as is indicated at 47, and this may be carried in clips 48 on the side of the box 3. One end of this type may be provided with the character 49 which means "stolen," while the opposite end may be provided with a character 50 which is a cancellation mark, and means "recovered."

While the record, which may be printed by means of the mechanism herein described, is especially designed for use in connection with automobiles as designated by their license numbers, it is, of course, to be understood that the mechanism is of general application in printing combinations of characters for recording other articles, or for printing for other purposes. The specific details of the mechanism are also capable of many modifications within the scope of the invention without sacrificing any of the advantages thereof, and my purpose is to cover all such modifications within the scope of the appended claims.

What is claimed is:

1. In a device of the character described, the combination of a base plate adapted to be placed in a measured position upon a sheet to be printed, said plate having a slot therein, a plurality of types mounted above the base plate, means for bringing any desired combination of said types into alinement above the slot, and means for depressing the selected types to form an imprint on the sheet therebeneath.

2. In a device of the character described, the combination of a base plate adapted to be placed in a measured position upon a sheet to be printed, said plate having a slot therein, a plurality of types mounted above the base plate, means for bringing any desired combination of said types into alinement above the slot, means for adjusting all of said types as a unit longitudinally of the slot to a predetermined measured position, and means for depressing the selected types to form an imprint on the sheet therebeneath.

3. In a device of the character described, the combination of a plurality of type bars, each provided with a plurality of depressible types and adjustable so as to bring any desired selection of types into alinement, means for simultaneously depressing the selected types when so alined to form an imprint on a sheet placed therebeneath, and means for measuring the coordinates of the spaces where the imprint is to be formed.

4. In a device of the character described, the combination of a box having a plurality of type bars adjustably mounted therein, each bar being provided with a plurality of depressible types, said bars being independently adjustable so as to bring any desired selection of types into alinement, and a cover pivoted to the box and having a flange so located as to engage the selected types, to depress the same, and form an imprint on a sheet placed therebeneath.

5. In a device of the character described, the combination of a base plate having a transverse slot therein, a box slidably mounted on said base plate and having a slot registering with the slot in the base plate, a plurality of parallel type bars mounted within the box and each provided with a plurality of depressible types, said bars being adjustable longitudinally to bring any desired selection of types into alinement above the slots, and means for simultaneously depressing the selected types when so alined to form an imprint on a sheet placed therebeneath.

6. In a device of the character described, the combination of a box having a bottom frame, drawer and a pivoted cover which combine to form a closed space, a plurality of parallel type bars mounted within and substantially filling said space when the drawer is closed and each having a plurality of depressible types, said bars being slidably adjustable independently of each other when the drawer is open to bring any desired selection of types into alinement, and means for depressing said types when so alined to form an imprint on a sheet placed therebeneath.

7. In a device of the character described, the combination of a frame having a drawer therein, said frame and drawer each having a series of parallel spacing bars arranged one above the other in pairs, a plurality of type bars mounted in the respective spaces between the bars and each provided with a plurality of depressible types, said type bars being individually slidable when the drawer is pulled out to bring any desired selection of types into alinement, and means for depressing the types so selected to form an imprint on a sheet placed therebeneath.

8. In a device of the character described, the combination of a frame, a drawer slidably mounted within the frame, said frame and drawer each having a series of parallel spacing bars arranged one above the other in pairs, a plurality of type bars each provided with a plurality of depressible types, said bars being slidably adjustable within the spaces between the spacing bars to bring any desired selection of types into alinement, and a cover pivoted to the frame and having a flange which is engageable with the selected types when the cover is closed to depress said selected types and form an imprint on a sheet placed therebeneath.

9. In a device of the character described, the combination of a frame having a floor provided with a transverse slot, a plurality of longitudinally arranged type bars each provided with a plurality of depressible types, said bars being slidable to bring any desired selection of types into registration with said slot, the faces of the types being normally in contact with the floor, and an inking pad located with its surface flush with the floor immediately behind said slot, so that the faces of the types form a wiping contact therewith as they are brought into registration with the slot, and means for simultaneously depressing the selected types to form an imprint through said slot.

10. In a device of the character described, the combination of a base plate having a transverse slot therein, a box slidably mounted on said plate and having a floor provided with a transverse slot registering with the slot in the base plate, a plurality of longitudinally arranged type bars, each provided with a plurality of depressible types normally in contact with the floor, said bars being slidable longitudinally to bring any desired selection of types into registration with said slots, an inking pad arranged with its surface in the path of the faces of said types as they are advanced into position above the slots, and a cover pivoted to the box and having a flange engageable with the types when the cover is lowered to project the selected types through said slots.

11. In a device of the character described, the combination of a box having a bottom frame, drawer and a pivoted cover which combine to form a closed space, a plurality of parallel type bars normally enclosed within said space and slidable when the drawer and cover are open to bring any desired selection of types into alinement, each of said type bars being provided with a notch at its forward end, by means of which it may be adjusted, and a bar mounted on the rear side of the cover and projectable into engagement with the rear ends of all of said type bars to initially advance the same, so that the notches will be accessible from the forward side of the box.

In testimony that I claim the foregoing as my own, I have hereto affixed my signature.

CHARLES C. KRUSE.